United States Patent
Makita et al.

(10) Patent No.: US 10,890,254 B2
(45) Date of Patent: Jan. 12, 2021

(54) SHIFT DRUM DRIVE UNIT AND STRADDLE TYPE VEHICLE

(71) Applicant: Kabushiki Kaisha F.C.C., Shizuoka (JP)

(72) Inventors: Shouji Makita, Shizuoka (JP); Kazuyoshi Miyachi, Shizuoka (JP); Ryouhei Chiba, Shizuoka (JP); Kaoru Iida, Shizuoka (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 306 days.

(21) Appl. No.: 15/745,986

(22) PCT Filed: Jun. 17, 2016

(86) PCT No.: PCT/JP2016/068065
§ 371 (c)(1),
(2) Date: Jan. 18, 2018

(87) PCT Pub. No.: WO2017/013977
PCT Pub. Date: Jan. 26, 2017

(65) Prior Publication Data
US 2018/0209538 A1   Jul. 26, 2018

(30) Foreign Application Priority Data
Jul. 22, 2015   (JP) ................. 2015-144529

(51) Int. Cl.
F16H 25/12 (2006.01)
F16H 63/18 (2006.01)
F16H 61/32 (2006.01)

(52) U.S. Cl.
CPC ............. *F16H 63/18* (2013.01); *F16H 25/12* (2013.01); *F16H 61/32* (2013.01)

(58) Field of Classification Search
CPC ............. F16H 63/18; F16H 63/16; F16H 63/08
See application file for complete search history.

(56) References Cited

U.S. PATENT DOCUMENTS 5,024,113 A * 6/1991 Ito ..................... B60K 17/04
123/179.1
2006/0011006 A1   1/2006 Suzuki
(Continued)

FOREIGN PATENT DOCUMENTS

CN   103363086 A   10/2013
CN   104500707 A   4/2015
(Continued)

OTHER PUBLICATIONS

International Search Report dated Sep. 6, 2016 filed in PCT/JP2016/068065.
(Continued)

*Primary Examiner* — William Kelleher
*Assistant Examiner* — Gregory T Prather
(74) *Attorney, Agent, or Firm* — Rankin, Hill & Clark LLP (57) ABSTRACT

A shift drum drive unit (230) rotatably includes a rotary drive body (231) and a power transmission mechanism (232) in a unit case (234) attached integrally with a crank case (111). The shift drum drive unit (230) further includes a shift actuator (233) on the outside of the unit case (234). The rotary drive body (231) includes a shaft fitting sleeve (231a) in which a shift shaft (225) configured to rotatably drive a shift drum (224) is fitted, and an indirect output gear (231b) having a fan-shaped gear partially projecting from an outer surface of the shaft fitting sleeve (231a). The power transmission mechanism (232) includes a gear configured to transmit rotary drive force of the shift actuator (233) to the indirect output gear (231b).

11 Claims, 4 Drawing Sheets

(56) References Cited

U.S. PATENT DOCUMENTS

| | | | |
|---|---|---|---|
| 2009/0031834 A1 | 2/2009 | Takeuchi | |
| 2011/0239805 A1 | 10/2011 | Fujimoto et al. | |
| 2013/0255415 A1 | 10/2013 | Adachi et al. | |
| 2016/0152126 A1* | 6/2016 | Tanaka | B60K 5/02 180/293 |
| 2016/0152137 A1* | 6/2016 | Sunahiro | F16H 63/18 180/364 |
| 2017/0227125 A1* | 8/2017 | Fujimoto | F16H 57/0006 |

FOREIGN PATENT DOCUMENTS

| | | |
|---|---|---|
| EP | 1617110 A1 | 1/2006 |
| EP | 2372196 A1 | 10/2011 |
| EP | 3179140 A1 | 6/2017 |
| JP | 2009024858 A | 2/2009 |
| JP | 2011196521 A | 10/2011 |
| JP | 2011208766 A | 10/2011 |
| JP | 2012215244 A | 11/2012 |
| JP | 2013-210088 A | 10/2013 |

OTHER PUBLICATIONS

Office Action dated Dec. 3, 2018 for the corresponding Chinese Patent No. 201680029592.7.
Decision of final rejection (Chinese OA) dated May 8, 2020 issued in the corresponding Chinese patent application No. 201680029592.7.

\* cited by examiner

SHIFT DRUM DRIVE UNIT AND STRADDLE TYPE VEHICLE

TECHNICAL FIELD

The present invention relates to a shift drum drive unit mounted on a straddle type vehicle such as a motorcycle or a four-wheel buggy car and to a straddle type vehicle including the shift drum drive unit.

BACKGROUND ART

Typically, a power transmission device is, at a self-propelled vehicle such as a motorcycle or a four-wheel buggy car, provided for transmitting drive force generated by an engine (a motor) to a drive wheel. The power transmission device is, while being connected or disconnected to/from the crankshaft, a mechanical device configured to change the number of rotations of a crankshaft of the engine to transmit the number of rotations to the drive wheel, and mainly includes a clutch and a transmission.

The clutch described herein is a mechanical device configured to transmit rotary drive force of the crankshaft of the engine to a transmission side while being connected or disconnected to/from the crankshaft. Moreover, the transmission is a mechanical device configured to change the number of rotations of the crankshaft of the engine by a plurality of gear stages formed by a combination of a plurality of gears, thereby transmitting the number of rotations to a drive wheel side.

In this case, the transmission is configured to rotatably drive a shift drum provided with a cam groove, thereby changing the gear stages. For example, in a motorcycle disclosed in Patent Literature 1 described below, a deceleration mechanism is supported by a crank case forming a portion of an engine and a cover member. The deceleration mechanism transmits shift actuator rotary drive force for rotatably driving a shift drum to a shift shaft (a shift spindle) coupled with the shift drum.

CITATION LIST

Patent Literature

Patent Literature 1: JP-A-2011-208766

However, in the motorcycle described in Patent Literature 1 as described above, a plurality of gears forming the deceleration mechanism is attached to a side wall of the crank case, and therefore, the following problems are caused. The size of the crank case is increased, leading to limitation on arrangement positions of other components. Further, due to vibration of the crank case, damage and vibration noise are caused among the gears forming the deceleration mechanism.

The present invention has been made to deal with the above-described problems. An object of the present invention is to provide the following shift drum drive unit and the following straddle type vehicle including the shift drum drive unit. According to this shift drum drive unit, the size of a crank case can be reduced while the degree of freedom in component arrangement can be increased. In addition, influence of vibration of the crank case can be reduced.

SUMMARY OF INVENTION

To achieve the above-described object, a feature of the present invention lies in a shift drum drive unit for rotatably driving a shift drum in a straddle type vehicle, the vehicle including an engine configured to generate drive force by fuel combustion, a transmission configured to change, for the drive force of the engine, a rotation speed by a plurality of gear trains forming a plurality of gear stages with different transmission gear ratios from one another, and a shift shaft formed in a shaft shape, protruding from an inside of a crank case forming a portion of the engine, and configured to rotatably drive the shift drum for changing the gear trains of the transmission in the crank case, the shift drum drive unit including: a shift actuator configured to rotatably drive the shift drum; a rotary drive body into which the shift shaft is inserted and which is rotatably driven together with the shift shaft by the shift actuator; and a unit case configured to support the shift actuator and to house an entirety of the rotary drive body in a state in which the rotary drive body is rotatable. The unit case includes an insertion port for inserting the shift shaft into the rotary drive body, and an attachment section for attachment of the unit case to the crank case.

According to the feature of the present invention configured as described above, the unit case integrally includes, in the shift drum drive unit, the shift actuator configured to rotatably drive the shift drum and the rotary drive body as a power transmission component configured to transmit rotary drive force of the shift actuator to the shift shaft. Further, this unit case is attached to the crank case through an attachment portion. Thus, the crank case does not require attachment portions for the shift actuator and the power transmission component, and therefore, can be compactly configured. Further, manufacturing of the crank case is facilitated. In addition, in the shift drum drive unit according to the present invention, the shift actuator and the power transmission component are not directly supported on the crank case. Thus, the shift drum drive unit is not directly vibrated due to vibration of the crank case. With these configurations, the size of the crank case can be reduced, and the degree of freedom in component arrangement can be increased in the shift drum drive unit according to the present invention. Further, influence of vibration of the crank case can be reduced. In addition, in the shift drum drive unit according to the present invention, the shift actuator and the rotary drive body can be collectively assembled with the crank case. Thus, favorable assembly workability can be provided, and therefore, maintenance burden can be reduced.

Moreover, another feature of the present invention is that the shift drum drive unit further includes a power transmission mechanism configured to transmit the rotary drive force of the shift actuator to the rotary drive body, thereby rotatably driving the rotary drive body and that the unit case houses the entirety of the power transmission mechanism.

According to another feature of the present invention configured as described above, the shift drum drive unit includes the unit case in a state in which the entirety of the power transmission mechanism configured to transmit the rotary drive force of the shift actuator to the rotary drive body is housed. Thus, the shift drum drive unit can include the power transmission mechanism without an increase in the size of the crank case. In this case, the power transmission mechanism is a mechanical element for transmitting power, such as a gear, a pulley, a belt, a chain, or a friction wheel.

Further, still another feature of the present invention is that in the shift drum drive unit, the rotary drive body is a direct output gear directly and rotatably supported in the unit case.

According to still another feature of the present invention configured as described above, the rotary drive body includes, in the shift drum drive unit, the direct output gear directly and rotatably supported in the unit case. Thus, the shift drum drive unit is configured so that rattling between the shift drum drive unit and the shift shaft can be reduced to the minimum extent and that the shift drum can be rotatably driven with high accuracy. Further, the constituent components of the shift drum drive unit can be reduced, and burden in the process of assembly and maintenance of the shift drum drive unit can be reduced.

In addition, still another feature of the present invention is that in the shift drum drive unit, the rotary drive body includes a shaft fitting sleeve which is directly and rotatably supported in the unit case and into which the shift shaft is inserted, and an indirect output gear attached to the shaft fitting sleeve to be rotatable together with the shaft fitting sleeve.

According to still another feature of the present invention configured as described above, the shift drum drive unit is configured such that the rotary drive body includes the shaft fitting sleeve into which the shift shaft is inserted and the indirect output gear attached to the shaft fitting sleeve to be rotatable together with the shaft fitting sleeve. Thus, the axial attachment position of the indirect output gear on the shaft fitting sleeve can be adjusted. Thus, the tolerance of the production and assembly accuracy of the component engaging with the indirect output gear and the unit case supporting such a component and the shaft fitting sleeve is expanded. Thus, production and maintenance can be facilitated.

Moreover, the present invention can be implemented not only as the invention relating to the shift drum drive unit, but also as the invention relating to a straddle type vehicle including the shift drum drive unit.

Specifically, in a straddle type vehicle including an engine configured to generate drive force by fuel combustion, a transmission configured to change, for the drive force of the engine, a rotation speed by a plurality of gear trains forming a plurality of gear stages with different transmission gear ratios from one another, and a shift shaft formed in a shaft shape, protruding from an inside of a crank case forming a portion of the engine, and configured to rotatably drive a shift drum for changing the gear trains of the transmission in the crank case, the straddle type vehicle includes a shift drum drive unit including a rotary drive body into which the shift shaft is inserted and which is rotatably driven together with the shift shaft, a shift actuator configured to rotatably drive the rotary drive body, and a unit case configured to support the shift actuator and to house an entirety of the rotary drive body with the unit case rotatably supporting the rotary drive body. The unit case includes an insertion port for inserting the shift shaft into the rotary drive body, and an attachment section for attachment of the unit case to the crank case. With this configuration, working effects similar to those of the above-described shift drum drive unit can be expected as well.

DESCRIPTION OF EMBODIMENTS

Figure 1:
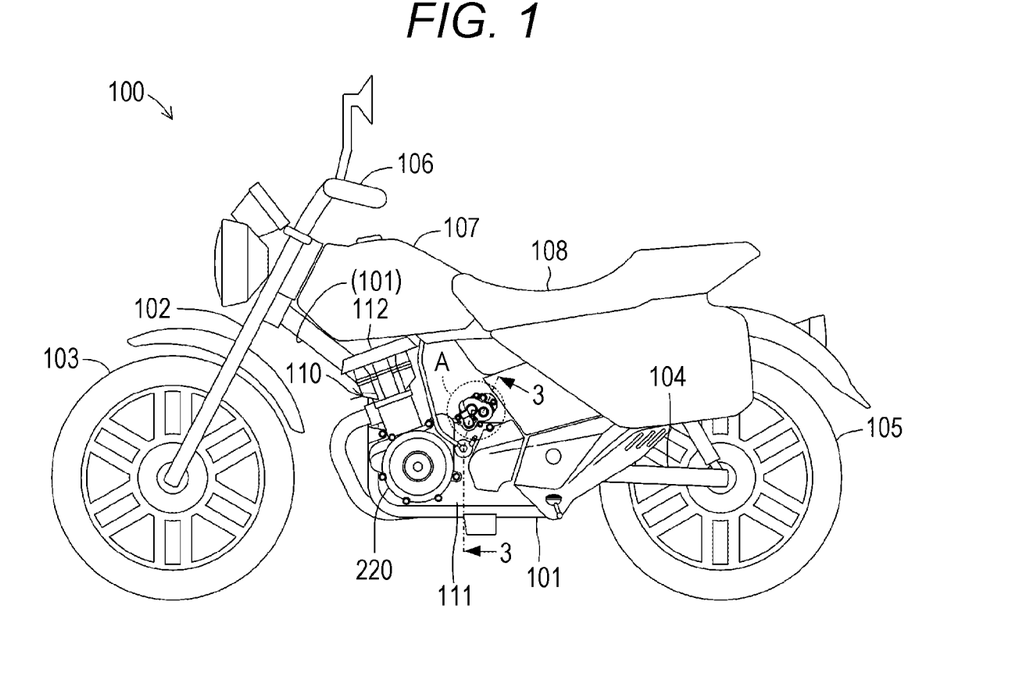
FIG. 1 is a side view of a schematic entire configuration of a straddle type vehicle including a shift drum drive unit according to the present invention.
Figure 2:
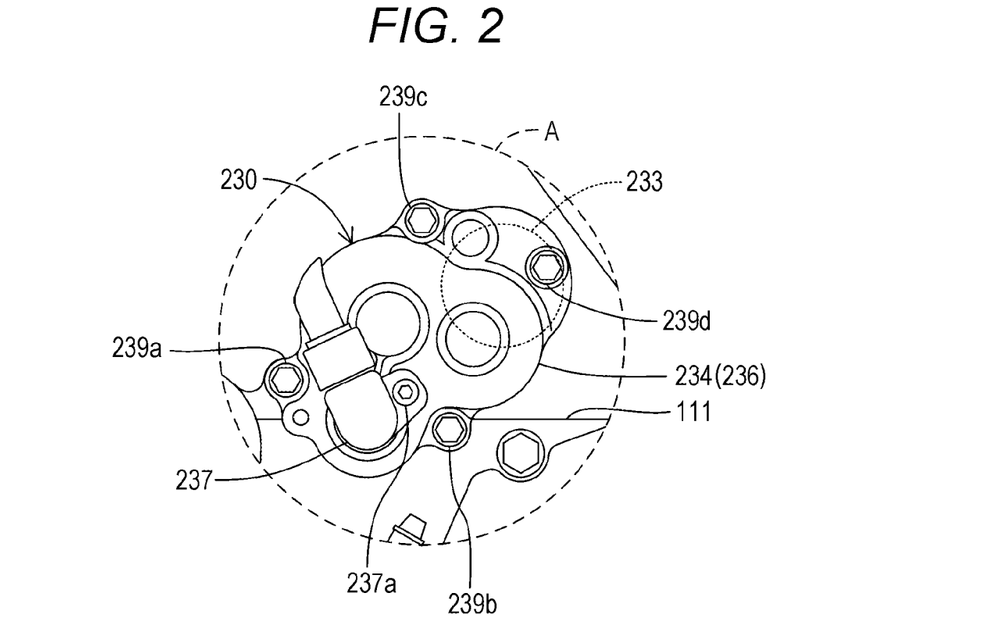
FIG. 2 is a partial enlarged view of a portion within a dashed circle A illustrated in FIG. 1.
Figure 3:
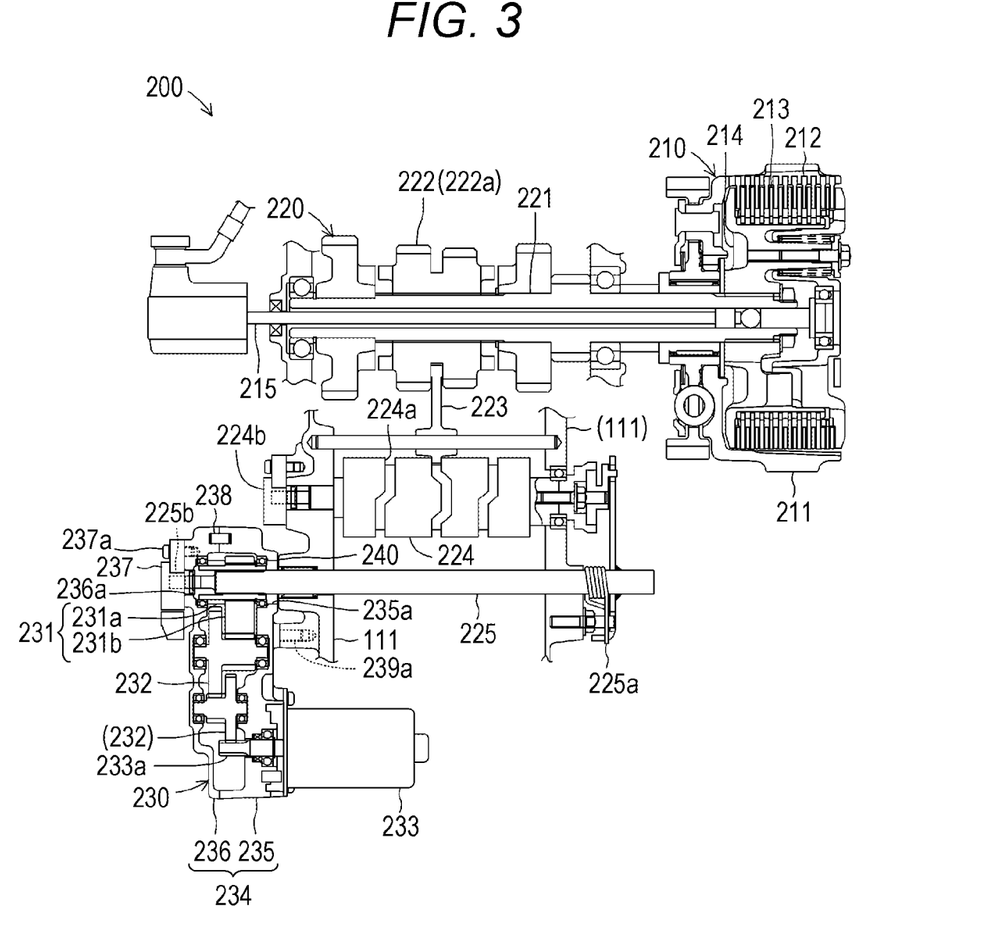
FIG. 3 is a partial sectional view of a schematic configuration of a main portion of a power transmission device of the straddle type vehicle as viewed from line 3-3 illustrated in FIG. 1.

One embodiment of a shift drum drive unit and a straddle type vehicle including the shift drum drive unit according to the present invention will be described below with reference to the drawings. FIG. 1 is a side view of a schematic entire configuration of a straddle type vehicle 100 including a shift drum drive unit 230 according to the present invention. Moreover, FIG. 2 is a partial enlarged view of a portion within a dashed circle illustrated in FIG. 1. Further, FIG. 3 is a partial sectional view of a schematic configuration of a main portion of a power transmission device 200 in the straddle type vehicle 100 illustrated in FIG. 1. Note that for the sake of easy understanding of the present invention, each figure referred to in the present description is schematically illustrated, each figure including, for example, exaggerated illustration of some components. For this reason, the dimensions of the components, the ratios among the components, and the like may vary. The straddle type vehicle 100 is a so-called straddle type two-wheel motor vehicle (a so-called motorbike) on which a user rides in a straddling state.

(Configurations of Straddle Type Vehicle 100 and Shift Drum Drive Unit 230)

The straddle type vehicle 100 is configured such that a front wheel 103 is supported through a front fork 102 at a front end portion of a frame 101 and that a rear wheel 105 is supported through a swing arm 104 at a rear end portion of the frame 101. The frame 101 is formed to extend in a front-to-back direction of the straddle type vehicle 100. In this case, the front fork 102 is formed to rotate relative to the frame 101 in a right-to-left direction of the straddle type vehicle 100. Further, handgrips 106 for steering the straddle type vehicle 100 in a traveling direction thereof are provided at an upper end portion of the front fork 102.

Moreover, in the straddle type vehicle 100, each of a fuel tank 107 and a seat 108 is provided at the rear of the handgrips 106 with the fuel tank 107 and the seat 108 being supported on the frame 101. Further, in the straddle type vehicle 100, each of an engine 110 and the power transmission device 200 is provided below the fuel tank 107 with the engine 110 and the power transmission device 200 being supported on the frame 101.

The engine 110 is a motor configured to generate rotary drive force by fuel combustion. Specifically, the engine 110 is a so-called reciprocating engine. In the engine 110, an air-fuel mixture of fuel and air is introduced into a cylinder (not shown) formed in a tubular shape. This air-fuel mixture is ignited and exploded by an ignition plug (not shown). Accordingly, a piston (not shown) reciprocates in the cylinder such that a crankshaft (not shown) coupled with the piston generates the rotary drive force. The rotary drive force of the crankshaft is transmitted to a clutch 210 of the power transmission device 200 through a primary drive gear attached to an end portion of the crankshaft.

Note that in the present embodiment, the engine 110 is assumed as a so-called four-stroke engine, but needless to say, may be a so-called two-stroke engine. Moreover, in the present embodiment, the engine 110 is assumed as a three-cylinder engine provided with three cylinders, but needless to say, may be an engine with four or more cylinders.

The crankshaft is housed in a crank case 111. The crank case 111 is an outer housing forming a portion of the engine 110. The crank case 111 holds and houses, in addition to the crankshaft, some components forming the power transmission device 200, such as a transmission 220 and a shift drum 224. This crank case 111 is molded by die casting of aluminum alloy, and is configured separately from a cylinder block 112 configured to house the piston of the engine 110. Note that the crank case 111 may be configured integrally with the cylinder block 112, needless to say.

The power transmission device 200 is a mechanical device configured to perform a gear change by a plurality of gear stages, thereby transmitting the rotary drive force generated by the engine 110. The power transmission device 200 mainly includes the clutch 210 and the transmission 220.

The clutch 210 is arranged between the engine 110 and the transmission 220 on a transmission path of the rotary drive force generated by the engine 110. The clutch 210 is a mechanical device configured to transmit the rotary drive force generated by the engine 110 to the transmission 220 and to block such transmission. As specifically illustrated in FIG. 3, the clutch 210 is provided on one end side (the right side as viewed in the figure) of a main shaft 221 in a shaft shape extending from the transmission 220. Note that hatching is omitted in FIG. 3.

The clutch 210 includes, in a clutch housing 211, a plurality of friction plates 212 and a plurality of clutch plates 213. The clutch housing 211 is made of an aluminum alloy material, and is molded in a cylindrical shape with a bottom. The friction plates 212 and the clutch plates 213 are pressed against each other, or are separated from each other. In this case, the friction plates 212 are held by the clutch housing 211 configured to be rotatably driven in association with rotary driving of the engine 110. The clutch plates 213 are held by a clutch hub 214 coupled with the main shaft 221.

In the clutch 210, a push rod 215 penetrating in the main shaft 221 is pushed to the right side as viewed in the figure by a not-shown clutch actuator, so that the friction plates 212 and the clutch plates 213 are separated from each other. In this manner, the clutch 210 is brought into a blocking state in which no drive force of the engine 110 is transmitted to the transmission 220. On the other hand, in the clutch 210, the push rod 215 is pulled in to the left side as viewed in the figure by the clutch actuator, so that the friction plates 212 and the clutch plates 213 are pressed against each other. In this manner, the clutch 210 is brought into a connection state in which the drive force of the engine 110 is transmitted to the transmission 220. Note that the clutch actuator includes an electric motor, and operation of the clutch actuator is controlled by a not-shown transmission control unit (TCU).

The TCU includes a microcomputer with a CPU, a ROM, a RAM, and the like. The TCU is configured to control, in an integrated manner, operation of the power transmission device 200 according to a not-shown control program stored in the ROM and the like in advance. More specifically, the TCU executes control of connection and disconnection of the clutch 210 and control of each type of gear change operation including shift-up and shift-down in the transmission 220. In this case, the TCU controls operation of the clutch actuator by PWM control.

The transmission 220 is a mechanical device for performing the gear change by the gear stages (e.g., a five-speed gear change) to transmit the rotary drive force generated from the engine 110 to the rear wheel 105. A plurality of gear trains 222 is provided in the transmission 220. The gear trains 222 form the gear stages with different transmission gear ratios from one another between the main shaft 221 connected to the crankshaft of the engine 110 through the clutch 210 and a not-shown counter shaft extending parallel to the main shaft 221 and connected to the rear wheel 105.

Each gear train 222 includes a plurality of drive gears 222a provided on the main shaft 221, and a plurality of driven gears (not shown) provided on the counter shaft. Opposing ones of the drive gears 222a and the driven gears are formed in a pair, and constantly engage with each other. In this case, a shift fork 223 is inserted into some of the drive gears 222a and some of the driven gears. These drive gears 222a and these driven gears are slidably displaced on the main shaft 221 and the counter shaft by the shift fork 223. Thus, in a dog clutch manner, the drive gears 222a are coupled with or separated from each other, and the driven gears are coupled with or separated from each other. This forms the gear stages.

Figure 4:
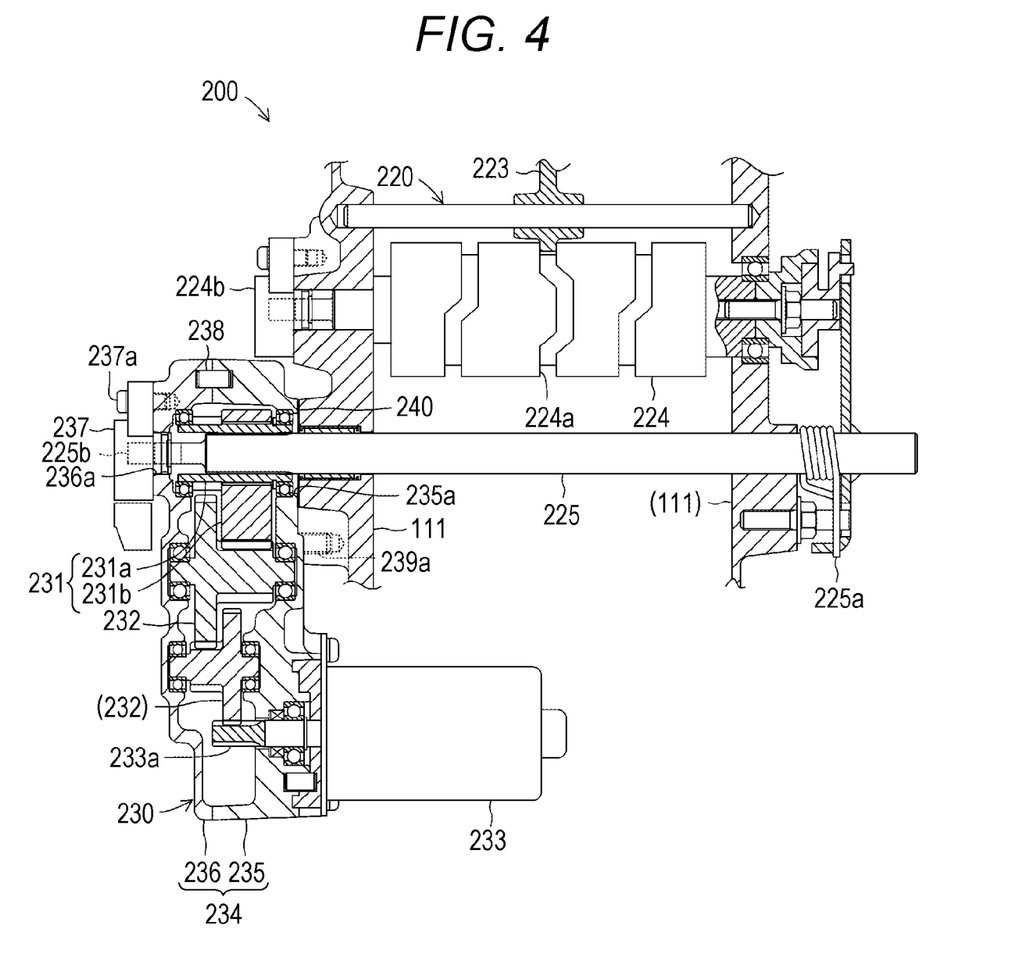
FIG. 4 is an enlarged sectional view of an entire configuration of the shift drum drive unit illustrated in FIG. 3.

The shift fork 223 is a fork-shaped component. The shift fork 223 forms the gear stages by pressing and sliding the slidably-displaceable drive gears 222a and the slidably-displaceable driven gears in an axial direction. The shift fork 223 is supported on the shift drum 224. The shift drum 224 is a circular columnar component for reciprocatively displacing the shift fork 223 along the main shaft 221 and the counter shaft. More specifically, a cam groove 224a in which end portions of the shift fork 223 are fitted is formed at an outer peripheral surface of a circular columnar body of the shift drum 224 as illustrated in FIG. 4. By rotary driving of the shift drum 224, the shift fork 223 is slidably displaced in the axial direction along the cam groove 224a.

This shift drum 224 is rotatably supported on the crank case 111 with a shift shaft 225 being coupled. An angle sensor 224b is provided at one end portion of the shift drum 224. The angle sensor 224b is a detector for detecting the rotation angle of the shift drum 224, and is connected to the TCU.

The shift shaft 225 is a component to be rotatably driven by the later-described shift drum drive unit 230, thereby rotatably driving the shift drum 224 to a predetermined rotation angle position. The shift shaft 225 is configured in such a manner that a steel material is formed in a rod shape. This shift shaft 225 is rotatably supported on the crank case 111 in a direction parallel to the shift drum 224. In this case, one end portion (the right side as viewed in the figure) of the shift shaft 225 is coupled with the shift drum 224 through a return spring 225a. Further, the other end portion (the left side as viewed in the figure) of the shift shaft 225 penetrates the crank case 111 to protrude outward of the crank case 111.

The return spring 225a is a coil spring for returning the shift drum 224 to a neutral position. Moreover, a spline to be fitted in a shaft fitting sleeve 231a and a sensor attachment portion 225b are formed on a tip end side of the shift shaft 225 protruding outward of the crank case 111. The sensor attachment portion is a thinly-formed tip end portion of the shift shaft 225. The sensor attachment portion 225b is a portion to be attached to an angle sensor 237, and is formed to have a plate shape such as a tip end portion of a flathead screwdriver.

The shift drum drive unit 230 is a mechanical device for rotatably driving the shift drum 224 to determine the position of the shift drum 224 at the predetermined rotation angle position. The shift drum drive unit 230 includes a rotary drive body 231. The rotary drive body 231 is a component coupled with the shift shaft 225 and rotatably driven together with the shift shaft 225. The rotary drive body 231 mainly includes the shaft fitting sleeve 231a and an indirect output gear 231b.

As illustrated in FIG. 4, the shaft fitting sleeve 231a is a component to be fitted onto the end portion of the shift shaft 225 protruding from the crank case 111. The shaft fitting sleeve 231a is configured in such a manner that a steel material is formed in a tubular shape. In this case, a spline to be fitted onto the tip end portion of the shift shaft 225 protruding outward of the crank case 111 is formed on an inner peripheral surface of the shaft fitting sleeve 231a. Further, a spline to be fitted in the indirect output gear 231b is formed on an outer peripheral surface of the shaft fitting sleeve 231a. This shaft fitting sleeve 231a is rotatably supported in a unit case 234.

The indirect output gear 231b is a steel component to be rotatably driven within a predetermined angle range by the rotary drive force received from a shift actuator 233. The indirect output gear 231b is configured such that a fan-shaped gear projects from a portion of an outer surface of a tubular body. In this case, the circumferential length of the fan-shaped gear of the indirect output gear 231b corresponds to a length in the range of each type of clockwise and counterclockwise rotary driving of the shift drum 224. A spline is formed on an inner peripheral surface of the tubular body of the indirect output gear 231b, and the outer peripheral surface of the shaft fitting sleeve 231a is fitted in this spline. That is, the indirect output gear 231b is held on the shaft fitting sleeve 231a in a state in which the indirect output gear 231b is rotatably driven together with the shaft fitting sleeve 231a. Moreover, a power transmission mechanism 232 engages with the indirect output gear 231b. Note that the indirect output gear 231b may be, for example, a spur gear provided with teeth across the entire outer surface of the tubular body.

The power transmission mechanism 232 is a component for transmitting the rotary drive force of the shift actuator 233 to the rotary drive body 231 while decelerating such force. In the present embodiment, the power transmission mechanism 232 includes two gears engaging with each other. The power transmission mechanism 232 including these two gears is rotatably supported in the unit case 234 with the power transmission mechanism 232 engaging with the rotary drive body 231 and a rotary drive shaft 233a of the shift actuator 233.

The shift actuator 233 is a motor for changing the gear stages including the gear trains 222 according to a rotation angle by rotary driving of the shift drum 224. The shift actuator 233 includes an electric motor whose operation is controlled by the TCU. This shift actuator 233 is attached to protrude outward of the unit case 234 in a state in which the rotary drive shaft 233a engages with the power transmission mechanism 232 in the unit case 234. Note that the TCU controls operation of the shift actuator 233 by PWM control.

The unit case 234 is a component forming an outer housing of the shift drum drive unit 230. The unit case 234 is formed to have such a hollow shape that the entirety of each of the rotary drive body 231, the power transmission mechanism 232, and the rotary drive shaft 233a of the shift actuator 233 is housed. In the present embodiment, the unit case 234 includes an inner case 235 and an outer case 236 that are molded by die casting of aluminum alloy.

The inner case 235 is a component forming the substantially half of the unit case 234 facing the crank case 111. The inner case 235 is formed to have such a recessed shape that the substantially half of each of the rotary drive body 231 and the power transmission mechanism 232 close to the crank case 111 and the rotary drive shaft 233a of the shift actuator 233 can be housed. With this configuration, the inner case 235 supports, on an inner surface thereof, one end portion of each of the rotary drive body 231 and the power transmission mechanism 232. Further, the inner case 235 supports, on an outer surface thereof, the shift actuator 233 with the rotary drive shaft 233a penetrating the inner case 235.

A portion of the outer surface of the inner case 235 facing the rotary drive body 231 is provided with an insertion port 235a. The insertion port 235a is a through-hole for inserting the tip end portion of the shift shaft 225 into the rotary drive body 231. The periphery of the insertion port 235a is formed in a planar shape in close contact with an outer surface of the crank case 111 through gaskets 240.

The outer case 236 is a component forming the substantially remaining half of the unit case 234 facing the opposite side of the crank case 111. The outer case 236 is formed to have such a recessed shape that the substantially half of each of the rotary drive body 231 and the power transmission mechanism 232 on the opposite side of the crank case 111 can be housed. With this configuration, the outer case 236 supports, on an inner surface thereof, the other end portion of each of the rotary drive body 231 and the power transmission mechanism 232.

A portion of an outer surface of the outer case 236 facing the rotary drive body 231 is provided with a sensor opening 236a. The sensor opening 236a is a through-hole into which a portion of the angle sensor 237 attached to the tip end portion of the shift shaft 225 is inserted. Moreover, the angle sensor 237 is, in an exposed state, attached to the outer surface around the sensor opening 236a, with a screw 237a. The angle sensor 237 is a detector for detecting the rotation angle position of the shift shaft 225, and is connected to the TCU.

These inner and outer cases 235, 236 are coupled together with four attachment bolts 239a to 239d in a state in which the inner and outer cases 235, 236 abut, through a positioning pin 238, each other in a direction in which the inner surfaces of the inner and outer cases 235, 236 face each other. With this configuration, the inner case 235 and the outer case 236 integrally form the unit case 234. In this case, two attachment bolts 239a, 239b of the four attachment bolts 239a to 239d arranged at the periphery of the rotary drive body 231 penetrate the unit case 234, and are fastened to the crank case 111. In this manner, the inner case 235 and the outer case 236 are integrated together. Meanwhile, two attachment bolts 239c, 239d integrate the inner case 235 and the outer case 236 together.

The gaskets 240 are provided between the unit case 234 and the crank case 111. The gaskets 240 are components for sealing the insertion port 235a of the unit case 234 and a portion of the crank case 111 through which the shift shaft 225 penetrates. Each gasket 240 is configured in such a manner that a soft material such as a paper material, a rubber material, or aramid fibers is formed in a thin ring plate shape.

The process of assembling the shift drum drive unit 230 will be described herein. Upon the processing of assembling the shift drum drive unit 230, a worker first prepares each of the shaft fitting sleeve 231a, the indirect output gear 231b, the power transmission mechanism 232, the shift actuator 233, the inner case 235, and the outer case 236. Next, the worker produces the rotary drive body 231 by the indirect output gear 231b being fitted onto the outer peripheral surface of the shaft fitting sleeve 231a.

Next, the worker integrates the rotary drive body 231 and the power transmission mechanism 232 with the attachment bolts 239c, 239d with the rotary drive body 231 and the power transmission mechanism 232 being arranged between the inner case 235 and the outer case 236 through a bearing. In this manner, a half-finished product of the shift drum drive unit 230 is assembled. In this case, the worker adjusts the position of the indirect output gear 231b on the shaft fitting sleeve 231a so that the position of engagement of the indirect output gear 231b with the power transmission mechanism 232 in the axial direction can be adjusted.

Next, the worker attaches the unit case 234 (in other words, the half-finished product of the shift drum drive unit 230) to a side wall of the crank case 111 by means of the attachment bolts 239a, 239b. In this case, at a position at which a portion of the unit case 234 close to the shift actuator 233 with respect to the periphery of the insertion port 235a projects upward on the outside of the crank case 111 as viewed in the figure, the worker attaches the above-described peripheral portion to a side surface of the crank case 111 through the gaskets 240. Note that in FIG. 2, the shift actuator 233 is indicated by a hidden line (a chain line).

Moreover, in this case, the worker inserts the tip end portion of the shift shaft 225 into the shaft fitting sleeve 231a through the insertion port 235a of the unit case 234 while attaching the unit case 234 to the crank case 111. That is, the two attachment bolts 239a, 239b are components for attaching the unit case 234 to the crank case 111, and correspond to an attachment section of the present invention.

Upon such assembly of the unit case 234, the worker may assemble the shift actuator 233 with the inner case 235 before the inner case 235 and the outer case 236 are integrated together with the attachment bolts 239c, 239d. Alternatively, the worker may assemble the shift actuator 233 with the inner case 235 after the inner case 235 and the outer case 236 have been integrated together with the attachment bolts 239c, 239d.

Next, the worker prepares the angle sensor 237. Thereafter, the worker inserts the angle sensor 237 into the sensor opening 236a of the unit case 234, and then, attaches the angle sensor 237 to the sensor attachment portion 225b of the shift shaft 225. In this manner, the shift drum drive unit 230 is assembled, and the process of attachment to the crank case 111 is completed. That is, the shift drum drive unit 230 is attached to the crank case 111 in a state in which the shift drum drive unit 230 integrally includes the rotary drive body 231, the power transmission mechanism 232, and the shift actuator 233.

(Operation of Straddle Type Vehicle 100 and Shift Drum Drive Unit 230)

Next, operation of the straddle type vehicle 100 and the shift drum drive unit 230 configured as described above will be described. This straddle type vehicle 100 travels while a change in the gear stages in the transmission 220, i.e., shift-up or shift-down, is performed based on shift operation by a driver and determination by the TCU.

In the processing of changing the gear stages in the transmission 220, the TCU rotates the shift actuator 233 in a forward or reverse direction by a predetermined amount according to the target gear stage as compared to the current gear stage. In this manner, the rotary drive body 231 is, in the shift drum drive unit 230, rotatably driven through the power transmission mechanism 232, thereby rotatably driving the shift shaft 225. As a result, in the transmission 220, the shift drum 224 is rotatably driven by rotary driving of the shift shaft 225. Accordingly, the gear trains 222 are recombined such that the gear stages are changed. In this case, the TCU detects the rotation angles of the shift drum 224 and the shift shaft 225 by means of detection signals from the angle sensors 224b, 237 while controlling the amount of rotary driving of the shift actuator 233.

As will be understood from the above-described operation, according to the above-described embodiment, the unit case 234 integrally includes, in the shift drum drive unit 230, the shift actuator 233 configured to rotatably drive the shift drum 224 and the rotary drive body 231 as a power transmission component configured to transmit the rotary drive force of the shift actuator 233 to the shift shaft 225. Further, the unit case 234 is attached to the crank case 111 through the attachment bolts 239a, 239b. Thus, the crank case 111 does not require attachment portions for the shift actuator 233, the rotary drive body 231, and the power transmission mechanism 232, and therefore, can be compactly configured. Further, manufacturing of the crank case 111 is facilitated. In addition, in the shift drum drive unit 230, the shift actuator 233, the rotary drive body 231, and the power transmission mechanism 232 are not directly supported on the crank case 111. Thus, the shift drum drive unit 230 is not directly vibrated due to vibration of the crank case. With these configurations, the size of the crank case 111 can be reduced, and the degree of freedom in component arrangement can be increased in the shift drum drive unit 230. Further, influence of vibration of the crank case 111 can be reduced. In addition, in the shift drum drive unit 230 of the present invention, the shift actuator 233, the rotary drive body 231, and the power transmission mechanism 232 can be, as the unit case 234, collectively assembled with the crank case 111. Thus, favorable assembly workability can be provided, and therefore, maintenance burden can be reduced.

Further, implementation of the present invention is not limited to the above-described embodiment, and various changes can be made without departing from the object of the present invention. Note that in the figures referred to in description of each variation below, the same reference numerals as those of the above-described embodiment are used to represent equivalent elements, and description thereof will not be repeated.

For example, in the above-described embodiment, the shift actuator 233 is attached to the inner case 235 in the shift drum drive unit 230. With this configuration, when the shift drum drive unit 230 is attached to the crank case 111, the shift actuator 233 can be arranged above the crank case 111 as viewed in the figure, i.e., arranged on the inside of the side surface of the crank case 111 in the right-to-left direction of the straddle type vehicle 100. Thus, the projection amount of the straddle type vehicle 100 in the right-to-left direction can be reduced. Consequently, the straddle type vehicle 100 can be compactly configured in a vehicle width direction thereof.

Moreover, in the above-described embodiment, the shift drum drive unit 230 is attached to the crank case 111 in a state in which only a portion (the periphery of the insertion port 235a) of the inner case 235 contacts the crank case 111 and the remaining portion of the inner case 235 projects from the crank case 111. That is, in the shift drum drive unit 230 of the present invention, each of the shift actuator 233, the rotary drive body 231, and the power transmission mechanism 232 is held only by the unit case 234. Thus, the crank case 111 can be more compactly configured as compared to a typical crank case. With this configuration, the shift drum drive unit 230 can increase the degree of freedom in arrangement of the components forming the engine 110 and the power transmission device 200. Moreover, the number of processing steps and a processing accuracy upon manufacturing of the crank case 111 are reduced, leading to easy manufacturing.

However, the shift drum drive unit 230 can be attached in a state in which an entire surface of the inner case 235 closely contacts the crank case 111. In this case, the shift drum drive unit 230 can also reduce, by the side wall of the crank case 111 and a side wall of the inner case 235, the influence of vibration of the crank case 111 on the shift actuator 233, the rotary drive body 231, and the power transmission mechanism 232. Note that in this case, the shift drum drive unit 230 is configured such that the shift actuator 233 is attached to the outer case 236.

Further, in the above-described embodiment, the shift drum drive unit 230 is attached to the crank case 111 through the gaskets 240. However, the shift drum drive unit 230 is attached to the crank case 111 through the elastic bodies such as the rubber material, and therefore, the influence of vibration from the crank case 111 can be more reduced.

In addition, in the above-described embodiment, the shift drum drive unit 230 is attached to the crank case 111 with the attachment bolts 239a, 239b. That is, the attachment bolts 239a, 239b correspond to the attachment section of the present invention. However, the attachment section may be any section configured to attach the unit case 234 to the crank case 111. Thus, the attachment section may employ welding for fixing the unit case 234 to the crank case 111.

Figure 5:
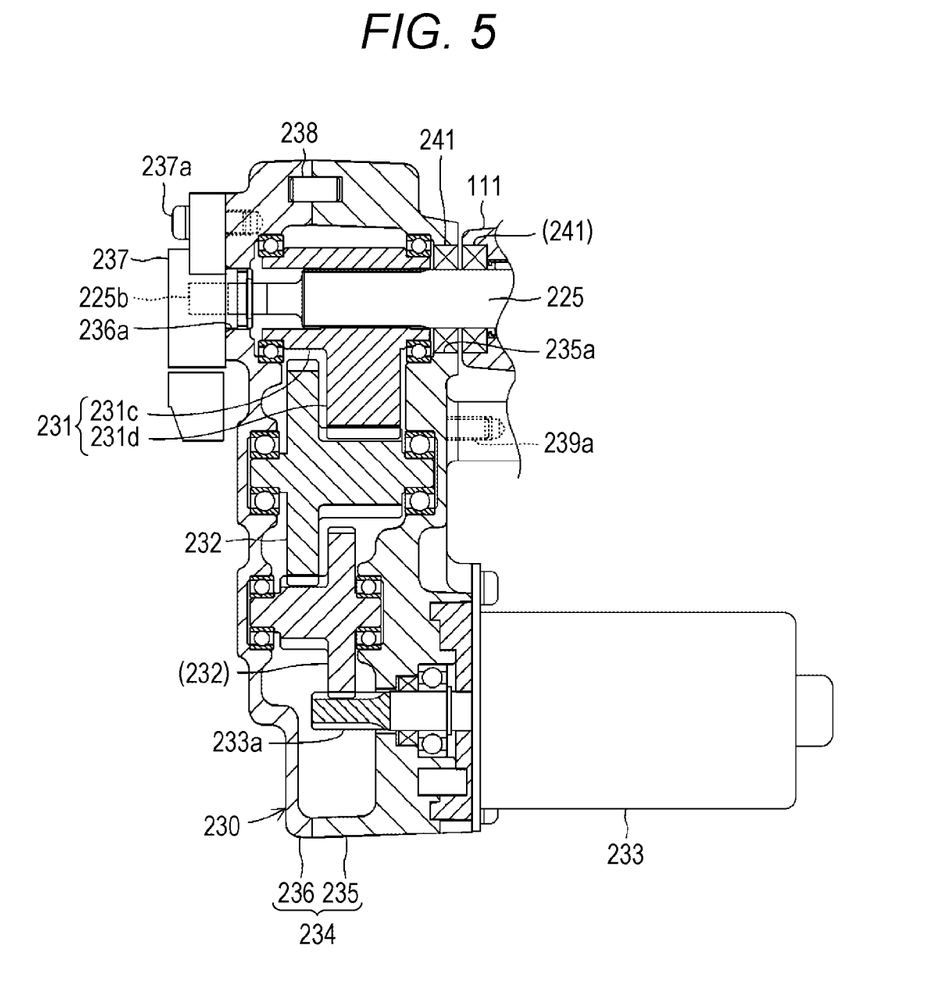
FIG. 5 is an enlarged sectional view of an entire configuration of a shift drum drive unit according to a variation of the present invention.

Moreover, in the above-described embodiment, the rotary drive body 231 includes the shaft fitting sleeve 231a and the indirect output gear 231b. However, the rotary drive body 231 can include, for example, a direct output gear configured such that the shaft fitting sleeve 231a and the indirect output gear 231b are integrated together as illustrated in FIG. 5. In this case, in the rotary drive body 231 including the direct output gear, a spline is formed on an inner peripheral surface of a tubular portion 231c into which the shift shaft 225 is to be inserted, and the spline formed at the tip end portion of the shift shaft 225 is fitted in such a spline. Further, a gear portion 231d is formed as a fan-shaped gear projecting from a portion of an outer surface of the tubular portion 231c. According to this configuration, in the shift drum drive unit 230, the rotary drive body 231 includes the direct output gear directly and rotatably supported in the unit case 234. Thus, the shift drum drive unit 230 is configured so that rattling between the shift drum drive unit 230 and the shift shaft 225 can be reduced to the minimum extent and that the shift drum 224 can be rotatably driven with high accuracy. Further, the constituent components of the shift drum drive unit 230 can be reduced, and burden in the process of assembly and maintenance of the shift drum drive unit 230 can be reduced.

Note that the shift drum drive unit 230 illustrated in FIG. 5 is configured such that rubber seals 241 made of a rubber material in an annular shape are, instead of the gaskets 240, provided in the insertion port 235a of the inner case 235 and on the side surface of the crank case 111 facing the insertion port 235a. With this configuration, the unit case 234 and the crank case 111 do not directly contact each other. Thus, the shift drum drive unit 230 can reduce the influence of vibration from the crank case 111. Needless to say, the indirect output gear 231b may be, for example, a spur gear provided with teeth across an entire outer surface of a tubular body.

Further, in the above-described embodiment, the rotary drive body 231 and the shift actuator 233 are coupled together through the power transmission mechanism 232 in the shift drum drive unit 230. However, the shift drum drive unit 230 can also be configured such that the rotary drive body 231 and the shift actuator 233 are directly coupled together, i.e., the power transmission mechanism 232 is omitted. In a case where the shift drum drive unit 230 includes the power transmission mechanism 232, the power transmission mechanism 232 can include other mechanisms than the gears, such as a belt mechanism, a chain mechanism, or a friction wheel mechanism.

In addition, in the above-described embodiment, the straddle type vehicle 100 is configured as the two-wheel motor vehicle (the so-called motorbike). However, the straddle type vehicle 100 can be broadly applied to self-propelled vehicles in a form in which a user is seated on the seat 108 in a straddling state. Thus, the straddle type vehicle 100 is also applicable to a four-wheel buggy.

DESCRIPTION OF REFERENCE SIGNS 100 straddle type vehicle
101 frame
102 front fork
103 front wheel
104 swing arm
105 rear wheel
106 handgrip
107 fuel tank
108 seat
110 engine
111 crank case
112 cylinder block
200 power transmission device
210 clutch
211 clutch housing
212 friction plate
213 clutch plate
214 clutch hub
215 push rod
220 transmission
221 main shaft
222 gear train
222a drive gear
223 shift fork
224 shift drum
224a cam groove
224b angle sensor
225 shift shaft
225a return spring
225b sensor attachment portion
230 shift drum drive unit
231 rotary drive body
231a shaft fitting sleeve
231b indirect output gear
231c tubular portion
231d gear portion
232 power transmission mechanism
233 shift actuator
233a rotary drive shaft
234 unit case
235 inner case
235a insertion port
236 outer case
236a sensor opening
237 angle sensor
237a screw
238 positioning pin
239a to 239d attachment bolt
240 gasket
241 rubber seal

The invention claimed is:

1. A shift drum drive unit for rotatably driving a shift drum in a straddle type vehicle, the vehicle including
an engine configured to generate drive force by fuel combustion,
a transmission configured to change, for the drive force of the engine, a rotation speed by a plurality of gear trains forming a plurality of gear stages with different transmission gear ratios from one another, and
a shift shaft formed in a shaft shape, protruding from an inside of a crank case forming a portion of the engine, and configured to rotatably drive the shift drum for changing the gear trains of the transmission in the crank case,
the shift drum drive unit comprising:
a shift actuator configured to rotatably drive the shift drum;
a rotary drive body into which the shift shaft is inserted and which is rotatably driven together with the shift shaft by the shift actuator; and
a unit case configured to support the shift actuator and to house an entirety of the rotary drive body in a state in which the rotary drive body is rotatable, wherein
the unit case includes
an inner case facing the crank case and an outer case facing an opposite side of the crank case,
an insertion port for inserting the shift shaft into the rotary drive body, and
an attachment section consisting of one or more bolts for attachment of the unit case to the crank case, and
the attachment section penetrates the unit case and is attached to the crank case, thereby integrating the inner case and the outer case together.

2. The shift drum drive unit according to claim 1, further comprising
a power transmission mechanism configured to transmit rotary drive force of the shift actuator to the rotary drive body, thereby rotatably driving the rotary drive body, wherein
the unit case houses an entirety of the power transmission mechanism.

3. The shift drum drive unit according to claim 2, wherein the rotary drive body is a direct output gear directly and rotatably supported in the unit case.

4. The shift drum drive unit according to claim 2, wherein the rotary drive body includes
a shaft fitting sleeve which is directly and rotatably supported in the unit case and into which the shift shaft is inserted, and
an indirect output gear attached to the shaft fitting sleeve to be rotatable together with the shaft fitting sleeve.

5. The shift drum drive unit according to claim 1, wherein the rotary drive body is a direct output gear directly and rotatably supported in the unit case.

6. The shift drum drive unit according to claim 1, wherein the rotary drive body includes
a shaft fitting sleeve which is directly and rotatably supported in the unit case and into which the shift shaft is inserted, and
an indirect output gear attached to the shaft fitting sleeve to be rotatable together with the shaft fitting sleeve.

7. The shift drum drive unit according to claim 1, wherein one end portion of the shift shaft penetrates one wall of the crank case and is coupled with the shift drum through a return spring, and other end portion of the shift shaft penetrates another wall of the crank case to protrude outward of the crank case.

8. The shift drum drive unit according to claim 1, wherein the one or more bolts comprises two attachment bolts arranged at a periphery of the rotary drive body.

9. A straddle type vehicle including
an engine configured to generate drive force by fuel combustion,
a transmission configured to change, for the drive force of the engine, a rotation speed by a plurality of gear trains forming a plurality of gear stages with different transmission gear ratios from one another, and
a shift shaft formed in a shaft shape, protruding from an inside of a crank case forming a portion of the engine, and configured to rotatably drive a shift drum for changing the gear trains of the transmission in the crank case,
the straddle type vehicle comprising
a shift drum drive unit including
a rotary drive body into which the shift shaft is inserted and which is rotatably driven together with the shift shaft,
a shift actuator configured to rotatably drive the rotary drive body, and
a unit case configured to support the shift actuator and to house an entirety of the rotary drive body with the unit case rotatably supporting the rotary drive body, wherein
the unit case includes
an inner case facing the crank case and an outer case facing an opposite side of the crank case,
an insertion port for inserting the shift shaft into the rotary drive body, and
an attachment section consisting of one or more bolts for attachment of the unit case to the crank case, and
the attachment section penetrates the unit case and is attached to the crank case, thereby integrating the inner case and the outer case together.

10. The straddle type vehicle according to claim 9, wherein one end portion of the shift shaft penetrates one wall of the crank case and is coupled with the shift drum through a return spring, and other end portion of the shift shaft penetrates another wall of the crank case to protrude outward of the crank case.

11. The shift drum drive unit according to claim 9, wherein the one or more bolts comprises two attachment bolts arranged at a periphery of the rotary drive body.

* * * * *